US006641028B2

(12) United States Patent
Shinoda et al.

(10) Patent No.: US 6,641,028 B2
(45) Date of Patent: Nov. 4, 2003

(54) FRICTION FILLER WELDING

(75) Inventors: Takeshi Shinoda, Nagoya (JP); Hajime Kaneko, Nagano Pref. (JP)

(73) Assignee: Nagoya University, Nagoya (JP)

( * ) Notice: Subject to any disclaimer, the term of this patent is extended or adjusted under 35 U.S.C. 154(b) by 0 days.

(21) Appl. No.: 09/939,124

(22) Filed: Aug. 24, 2001

(65) Prior Publication Data

US 2002/0047037 A1 Apr. 25, 2002

(30) Foreign Application Priority Data

Aug. 25, 2000 (JP) ........................................ 2000-255440

(51) Int. Cl.[7] ................................................. B23K 20/12
(52) U.S. Cl. .................................................... 228/112.1
(58) Field of Search .......................... 228/112.1, 114.5, 228/110.1, 212, 233.1, 234.1; 156/73.5

(56) References Cited

U.S. PATENT DOCUMENTS

| | | | | |
|---|---|---|---|---|
| 3,745,641 A | * | 7/1973 | Paolini | 228/114.5 |
| 3,874,067 A | * | 4/1975 | Toyooka et al. | 228/112.1 |
| 4,063,676 A | * | 12/1977 | Lilly | 228/114 |
| 4,331,280 A | * | 5/1982 | Terabayashi et al. | 228/114.5 |
| 5,930,332 A | * | 7/1999 | Eggleston et al. | 378/144 |

FOREIGN PATENT DOCUMENTS

| | | | |
|---|---|---|---|
| GB | 1 435 607 | 5/1976 | ........... B23K/19/02 |
| GB | 1 505 832 | 3/1978 | ........... B23K/19/02 |
| JP | 39-9473 | 11/1936 | |
| JP | 50-70133 | 6/1975 | ........... B23K/19/02 |
| JP | 58020389 A | 2/1983 | ........... B23K/20/12 |
| JP | 61176484 A | 8/1986 | ........... B23K/20/00 |
| JP | 06328273 A | 11/1994 | ........... B23K/20/12 |
| JP | 8010802 A | 1/1996 | ............ B21B/1/26 |
| JP | 2000094157 A | 4/2000 | ........... B23K/20/12 |

* cited by examiner

Primary Examiner—M. Alexandra Elve
Assistant Examiner—Jonathan Johnson
(74) Attorney, Agent, or Firm—Stoel Rives LLP

(57) ABSTRACT

At least two workpieces are provided and an intermediate member is arranged as a filler between opposed end faces of the workpieces. The workpieces are pressed against each other via the intermediate member to produce friction pressure therebetween while rotating or vibrating the intermediate member at a high speed. Then, each workpiece is upset to the intermediate member on bringing the rotation or the vibration of the intermediate member to a halt. Thus, the workpieces are easily and securely joined without causing any defects.

11 Claims, 12 Drawing Sheets

FRICTION FILLER WELDING

TECHNICAL FIELD

The present invention relates to a method of friction filler welding for joining objects (workpieces) to be welded, such as rails or reinforcement, easily and securely.

BACKGROUND OF THE INVENTION

Although joining methods such as electric arc welding or gas-pressure welding are conventionally adopted when rails etc. are connected to each other by the end faces for elongation, the above conventional joining methods are accompanied by inevitable occurrence of a weld defect or an embrittled structure, since any welding method once melts joining portions and then joins them.

To solve the drawback in the above joining methods, a rotational friction welding has been developed in these days. See, for example, "Welding and Joining Manual" (edited by Japan Welding Society, publisher: Maruzen Inc., pp. 480–489) as a reference.

However, such rotational friction welding generates a required thermal energy for welding by rotating at least one of workpieces to be joined; therefore, problems remain in that it is technically difficult and impractical to rotate the workpieces themselves, especially when the workpieces are bulky or long, or have variant cross sections.

SUMMARY OF THE INVENTION

The object of the present invention is to propose a novel method of friction filler welding which is capable of joining easily and securely without having any limitation on the size and the configuration of the workpieces, or being accompanied by the weld defect.

The present invention is related to a method of joining at least two workpieces at their end faces by friction filling welding, said method comprising the steps of:

arranging an intermediate member as a filler between opposed end faces of the workpieces, pressing said workpieces against each other via the intermediate member to produce friction pressure therebetween while rotating or vibrating the intermediate member at a high speed, and upsetting each workpiece to the intermediate member on bringing the rotation or the vibration of the intermediate member to a halt.

In the present invention, the pushing velocity of the workpiece represents the velocity in which the workpiece is pushed against an intermediate member by giving an external force upon the workpiece. Herein, the approach velocities of the workpiece during generating the friction pressure and upsetting the workpieces are preferably 0.01–5 mm/s. Also, the number of revolutions of the intermediate member is preferably 100–10,000 rpm, or the frequency of vibrations for the intermediate member is preferably 10–1,000 rpm.

When the workpieces are upset, it is required to secure the soundness of the joined portion and to deform the intermediate member sufficiently to enforce the joint. Therefore, the pressure of upsetting the workpieces is preferably equal to or greater than the friction pressure generated in the high-speed rotation or vibration of the intermediate member.

Especially, the period of time to press the workpieces against the intermediate member which is rotating or vibrating at a high speed is preferably 1–1,000 seconds and the period of time of upsetting the workpieces is preferably 1–100 seconds.

Additional aspects and advantages of this invention will be apparent from the following detailed description of preferred embodiments thereof, which proceeds with reference to the accompanying drawings.

BRIEF DESCRIPTION OF THE DRAWINGS

For a better understanding of the invention, reference is made to the accompanying drawings, wherein.

DETAILED DESCRIPTION OF PREFERRED EMBODIMENTS

Figure 1A:
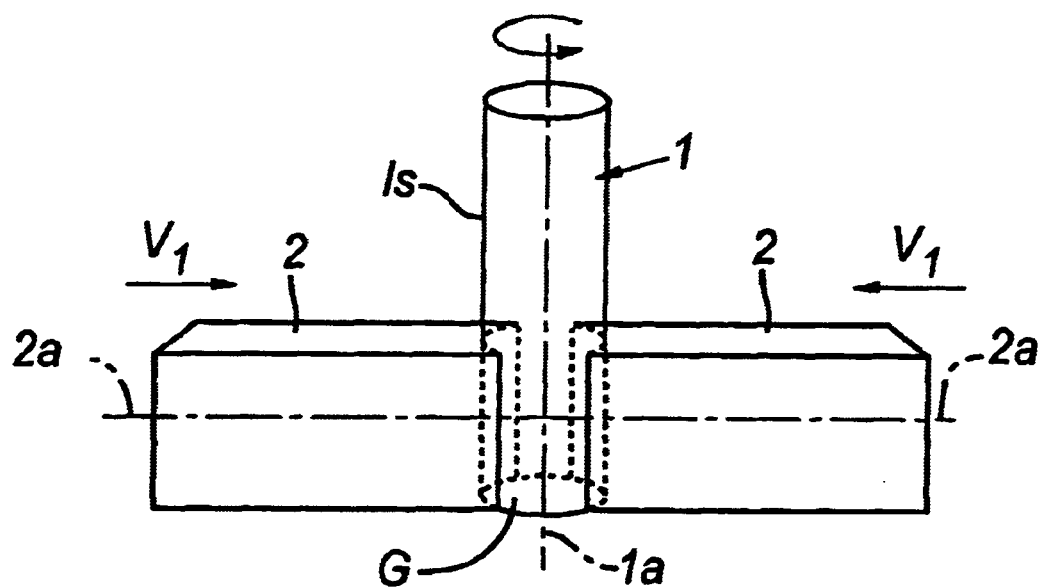
FIG. 1 illustrates a process of welding according to the invention, wherein (a) is a side view and (b) is a plan view.
Figure 1B:
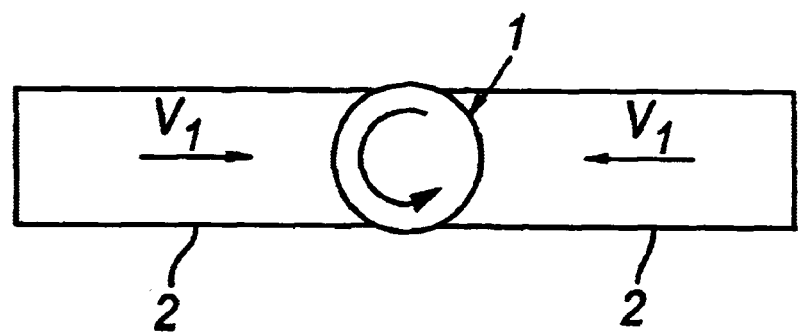

In the invention, the friction pressure required for the joining is secured by pushing end faces of the workpieces against a filler, while either rotating or vibrating the filler at a high speed.

The invention will be described in further detail with reference to the attached drawings. FIGS. 1(a), 1(b), 2 and 3 show an example of the method of joining according to the invention. In these figures, reference numeral 1 indicates a filler and reference numeral 2 indicates workpieces to be joined. Each workpiece 2 has a longitudinal axis 2a that extends through its associated end face.

First, to join the work-pieces 2 together at the end faces, the filler or intermediate member 1 is positioned in a gap G between the workpieces 2 and rotated at a high speed about an intermediate longitudinal axis 1a, as shown in FIG. 1.

Figure 2:
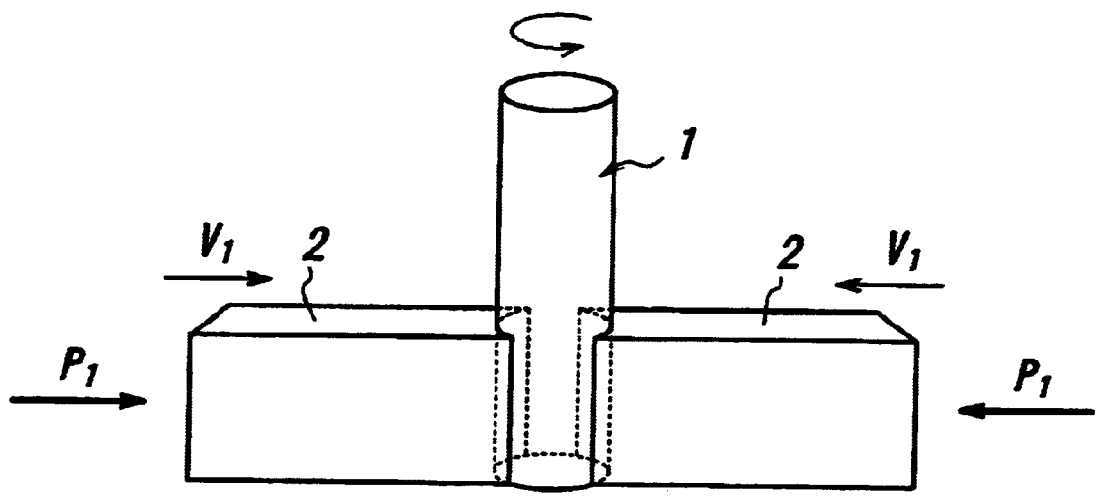
FIGS. 2 and 3 illustrate processes of welding according to the present invention.
Figure 3:
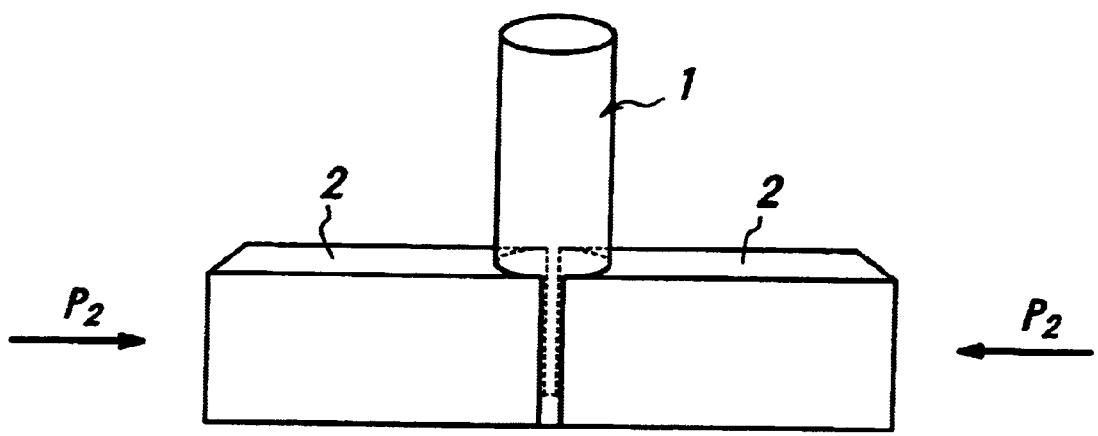
Figure 4:
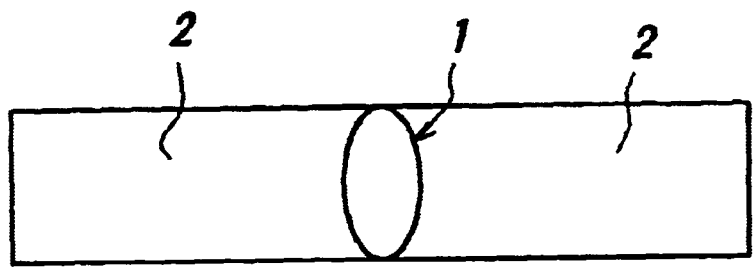
FIGS. 4 and 5 are plan views of the joined state of workpieces.
Figure 5:
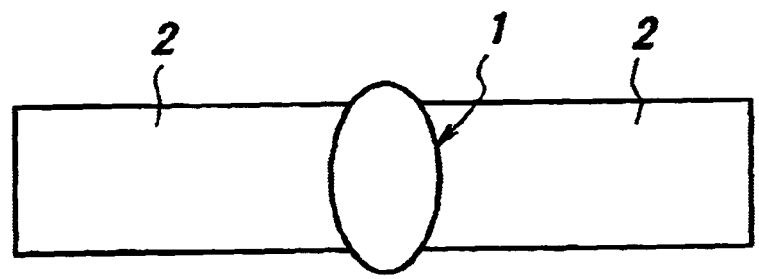

Then the workpieces 2 are pressed along their respective longitudinal axes 2a against the exterior surface 1s of filler 1 at a controlled pushing velocity $V_1$ to give a required friction force as shown in FIG. 2. Subsequently the workpieces 2 are upset to the filler 1 at the controlled pushing velocity $V_1$ on bringing the rotation of the filler 1 to a halt as shown in FIG. 3. The workpieces 2 and the filler 1 after the upsetting are in such a condition that is shown in FIG. 4 or 5.

Organic materials such as plastics as well as metal materials such as steel can be adopted as the workpieces to be used in the invention.

When the workpieces are made of a metallic material, a like metallic material or an alloy thereof can be used as the filler. When the workpieces are made of an organic material such as plastics, a so-called composite material which is enforced with a like organic material or fibers etc. can be used as the filler. As for the intermediate member, the equivalent material of the workpieces is basically used for it, but the invention can be also adopted for the joining between different materials. For example, when iron and copper are selected for the workpieces and nickel or the like is selected for the intermediate member, it is possible to join such workpieces since combinations of iron and nickel, and of copper and nickel hardly produce brittle intermetallic compounds in phase diagram. In such cases, filler metals etc. which are used in brazing technique are used, and both of the workpieces and the intermediate member are not limited to their materials, etc.

The friction pressure generated between the workpieces 2 and the filler 1 is preferably about 10–500 MPa from the viewpoint of the end face of the workpieces being heated to a sufficient temperature region.

The upsetting pressure is preferably about 10–1,000 MPa to secure the soundness of the joined portion and the sufficient strength of the joint.

In the invention, the pressure of the upsetting must be equal to or larger than the friction pressure, because the strength and the soundness of the joined portion can be ensured in this case. Especially, the degree of the deformation of the intermediate member on upsetting is preferably 95% or less, more preferably about 10–95% of the original diameter of the intermediate member.

When the friction pressure is generated or the workpieces are upset, the workpieces 2 should be pressed against the filler 1. A hydraulic jack or an electric jack is used as a specific measure for this sake.

In the invention, when the filler is rotated at a high speed, a round bar is basically used as the filler. However, when the friction pressure is generated by, for example, giving a vibration to the filler along its axis, a filler having a rectangular cross section may also be employed.

The filler having a diameter equivalent to or larger than the cross section area of the end face of the workpiece is preferably used to attain more accurate joining of the workpieces.

Figure 6:
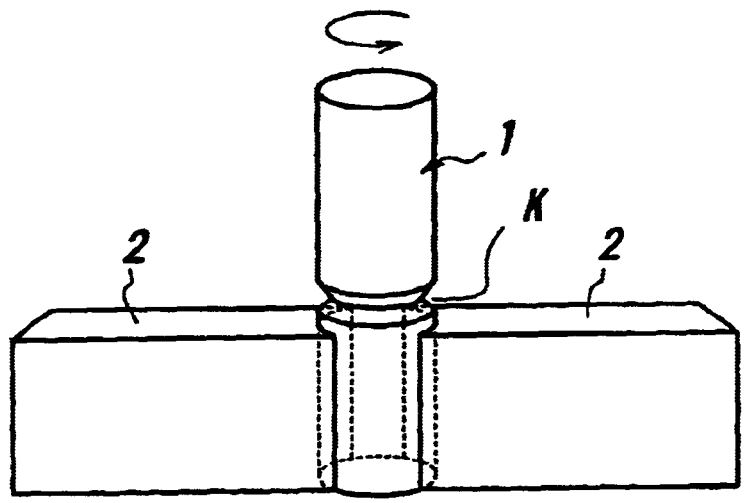
FIG. 6 shows an example having a notched part K on a filler.

In the invention, a plurality of notched parts K as shown in FIG. 6 can be made around the filler 1 to attain a homogeneous temperature distribution as well as to prevent fracture of the filler and to increase the heat transfer into around the joined portion in the process of joining the workpieces 2. Although these notched parts K have a depth of about 3 mm herein, the depth or the width is not particularly limited. Also, as for the shape of the cross section, any of V-shapes, U-shapes or channels may be employed. However, when the size and the shape of the notched parts K are so set that their temperatures after the upsetting may exceed the fracture strength of the filler 1, the filler 1 can be automatically cut at the notched parts K during the upsetting, so that a finish machining of the joined portion can be advantageously simplified.

Figure 7:
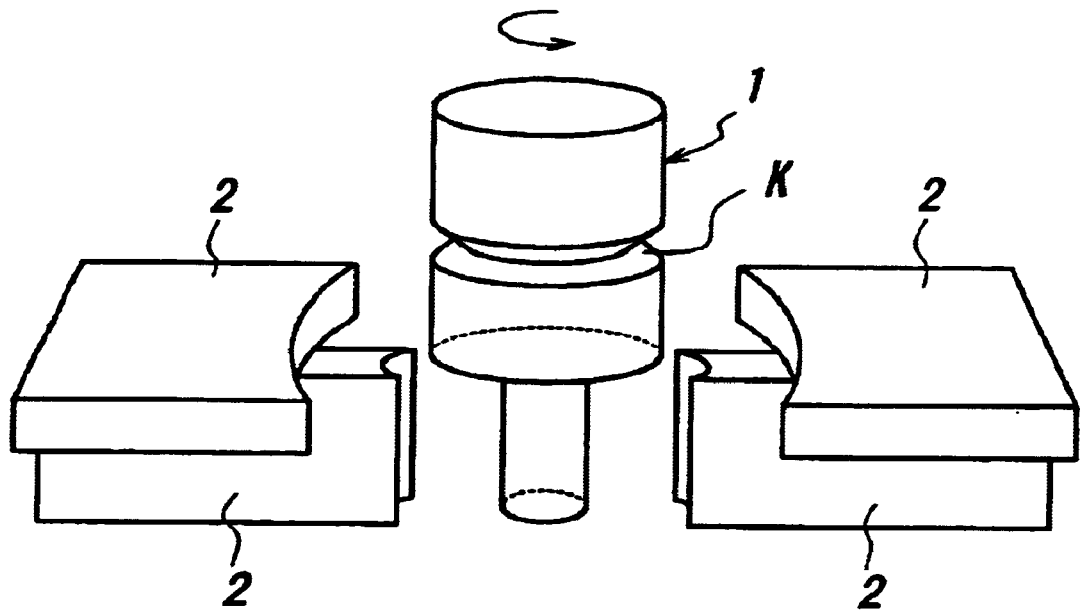
FIGS. 7 and 8 show other examples of a process of welding according to the invention.

FIG. 1 shows an example of a joint in which the end faces of the workpieces 2 have the same cross section. However, workpieces having the different cross sections can be joined. Also, the invention can be applied to, for example, such joint as shown in FIG. 7 that workpieces 2 having different cross sections are piled up at each side and the outer shape of the filler 1 is processed to adjust to the end faces thereof.

Figure 8:
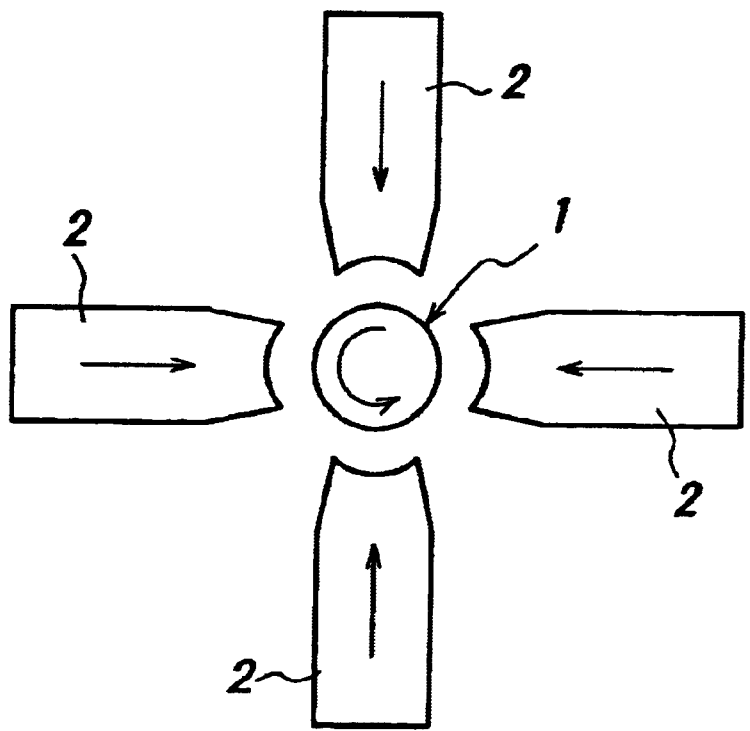

FIG. 8 shows an example of pressing and joining the workpieces 2 against the filler 1 as a center from four axial directions. By changing the number of the workpieces 2, the pleiotaxy joining can be performed.

Figure 9:
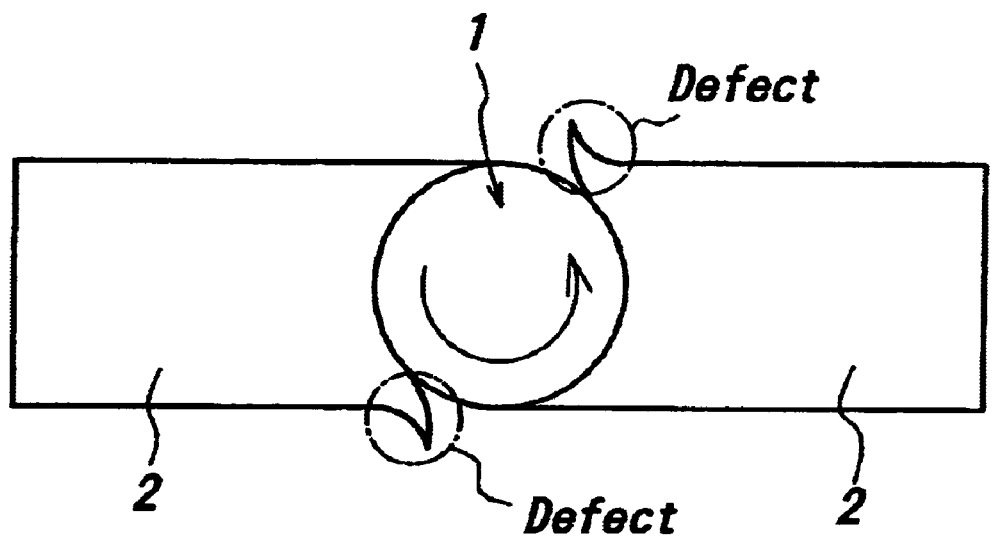
FIG. 9 is a schematic diagram of the joined portion of the workpieces.

In the invention, joining defects such as burrs may arise on boundaries of the workpieces 2 to the filler 1 depending on the shape at the end faces of the workpieces 2 and the joining condition, as shown in FIG. 9.

Figure 10:
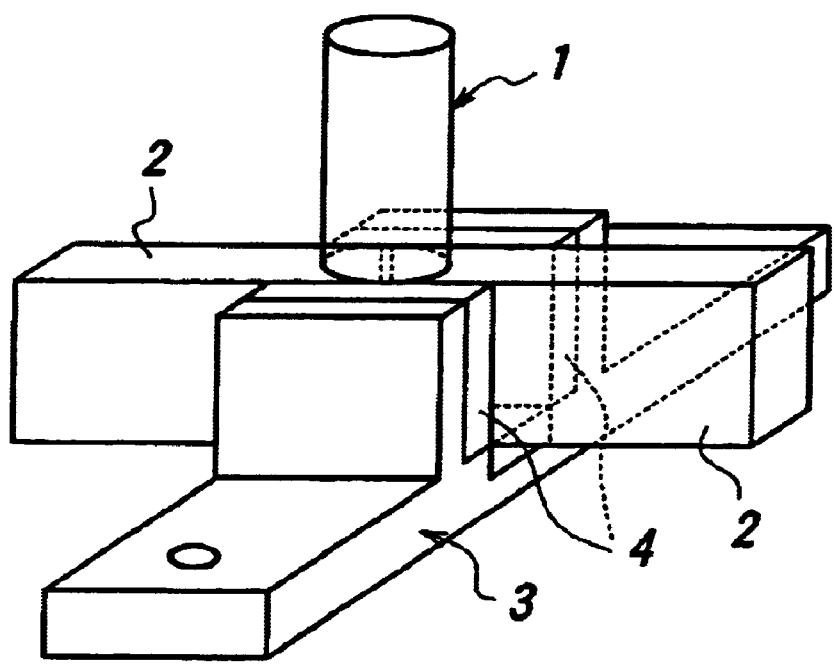
FIG. 10 illustrates a configuration example of a jig preferably employed in the invention.
Figure 11:
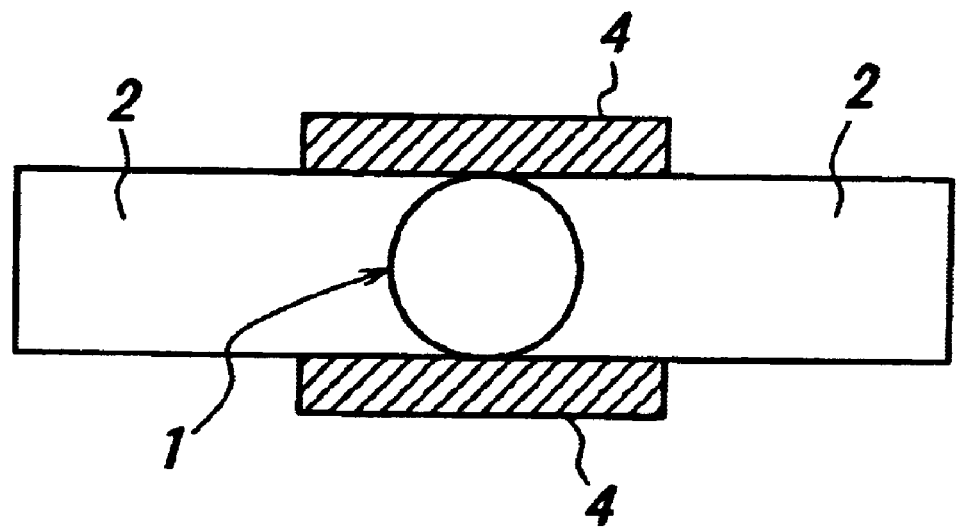
FIGS. 11 and 12 are plan views of the joined portion when the jig is used.
Figure 12:
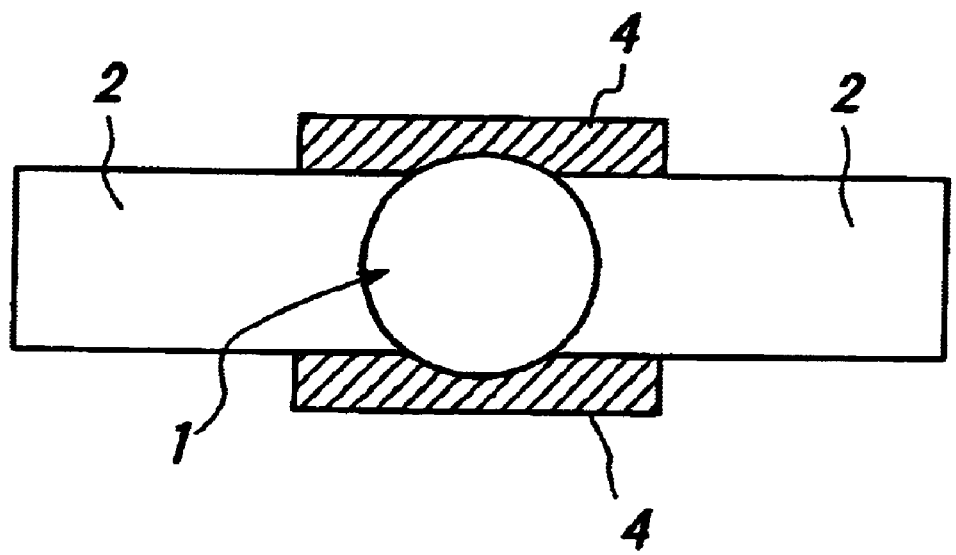

For this reason, a jig as shown in FIG. 10 can be used when the workpieces 2 are to be joined. In the figure, reference numeral 3 indicates a base member, and reference numeral 4 indicates a holder comprising members of such as tungsten carbide, which is held by the base member 3 and guides the workpieces 2 with the filler 1 at the joined portion of the workpieces 2 by pinching them as shown in FIGS. 11 and 12.

The defect shown in FIG. 9 can be effectively avoided by joining the workpieces 2 with such a jig.

Figure 13:
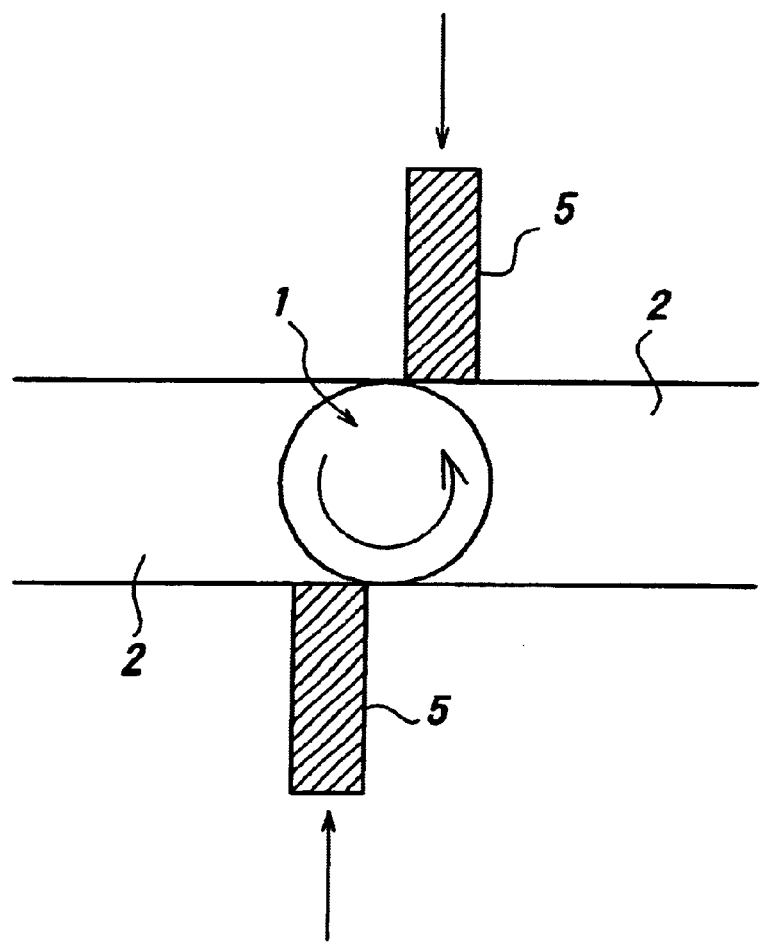
FIG. 13 shows another example of a jig preferably employed in the invention.

FIG. 13 shows an example of applying pressing members 5 as an alternative of the holder 4 in FIG. 10, to press only against the sites of the workpieces where the defect may occur. Such pressing member 5 can be used in the invention.

Figure 14:
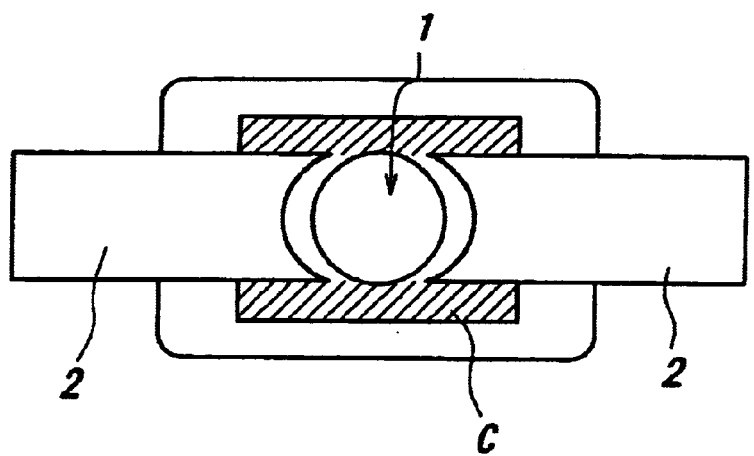
FIG. 14 shows another embodiment of a process of welding according to the invention.

When it is feared that an oxidization around the joined portion may cause a defect at the time of joining the workpieces 2, the end faces of the workpieces 2 including the filler 1 are surrounded and filled with ceramic particles C as shown in FIG. 14, whereby oxidization can be prevented or joining can be achieved while the ceramic particles C act as a reductant.

Figure 15A:
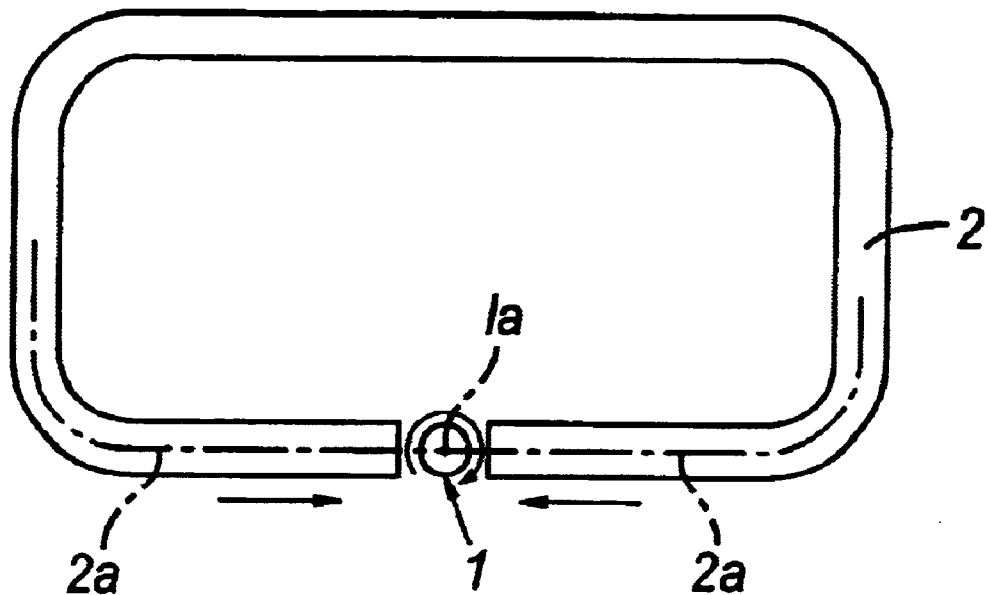
FIGS. 15(a) and (b) are examples of adopting the invention to join reinforcing steel materials.
Figure 15B:
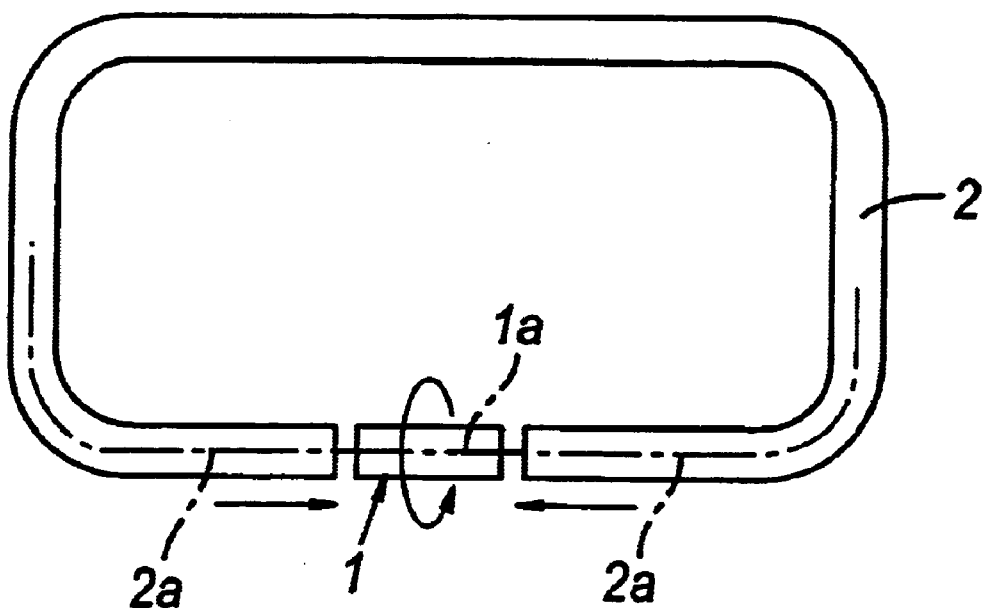

In addition, in the invention, such a reinforcement member as shown in FIGS. 15(*a*) and (*b*) constituting a concrete column can be joined as a closed loop, thus the on-site construction is easy as compared to other joining methods such as flash butt welding or gas pressure welding. In FIGS. 15(*a*) and (*b*), the workpieces 2 are portions of a unitary article and their longitudinal axes 2a are portions of a common longitudinal axis.

Figure 16:
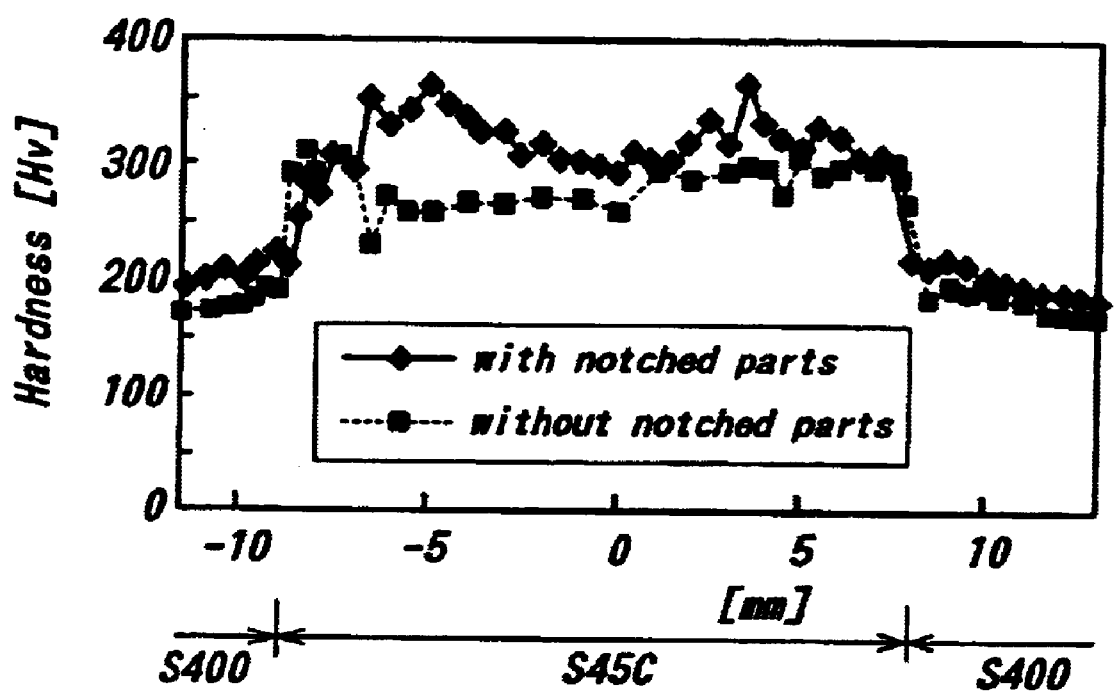
FIG. 16 is a graphical representation showing fluctuation of the stiffness at the joined portion.

Using a round bar of S45C as a filler 1 and a plate of S400 as a workpiece, the workpiece was joined with either a filler with or without notched parts on the same condition, and the hardness around the joined portions were investigated. The results are shown in FIG. 16.

The notched parts of the filler had a good influence on the heat input since a hardened area was enlarged around the joined portion, and the structure observation also indicated a fine structure area to be enlarged.

Using a round bar of S45C (tensile strength was 570 MPa) having a diameter of 20 mm or 25 mm as a filler and plates of S400 (tensile strength 400–500 MPa) having the cross section area of 20×20 $mm^2$ as workpieces, were joined under the following conditions. The obtained joints were subjected to macro observation by a projector, structure observation by an optical microscope and a tensile test to evaluate the performance of the joints.

The joining conditions were:
Number of revolutions of the filler: 2,000 rpm;
Friction pressure: 38.0 MPa;
Pushing velocity for the friction pressure: 0.2 mm/sec.;
Friction time: 30, 60 sec.;
Pushing velocity for the upsetting pressure: 1.0 mm/sec.;
Upsetting pressure: 60.1 MPa; and
Upsetting time: 20 sec.

Figure 17A:
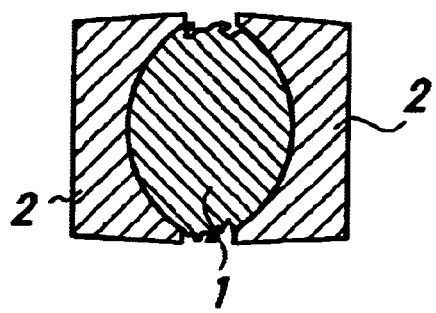
FIGS. 17(a) and (b) are horizontal and vertical sectional macro views of a joint A.
Figure 17B:
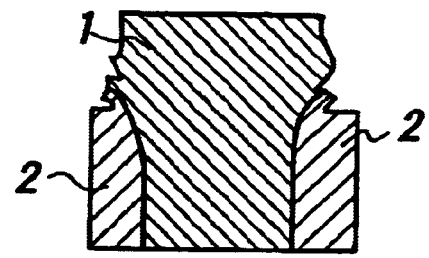
Figure 18A:
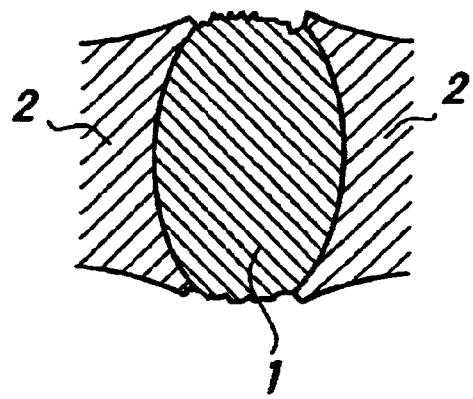
FIGS. 18(a) and (b) are horizontal and vertical sectional macro views of a joint B.
Figure 18B:
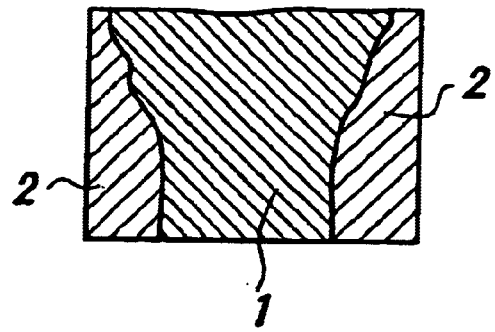

FIGS. 17 and 18 schematically show horizontal and vertical sectional macro views of the joint A (using the filler of 20 mm diameter with the friction time $t_1$ of 30 sec.) and the joint B (using the filler of 25 mm diameter with the friction time $t_1$ of 60 sec.), respectively. In each joint, some defects had been observed at the end portions, but the joining conditions were good at the other portion.

Figure 19:
FIG. 19 is a photograph of the metal structure of the joint A.
Figure 20:
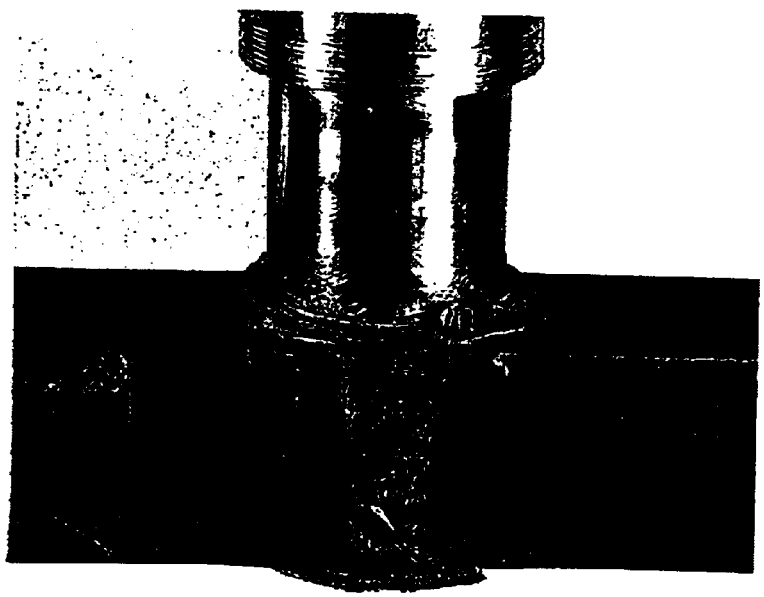
FIG. 20 is a photograph showing the external appearance of the joint A.
Figure 21:
FIG. 21 is a photograph showing the external appearance of the joint B.

FIG. 19 is a metallographical photograph of the joint A in FIG. 17. FIGS. 20 and 21 are photographs showing the external appearances of the joints A and B respectively immediately after the upsetting.

Figure 22:
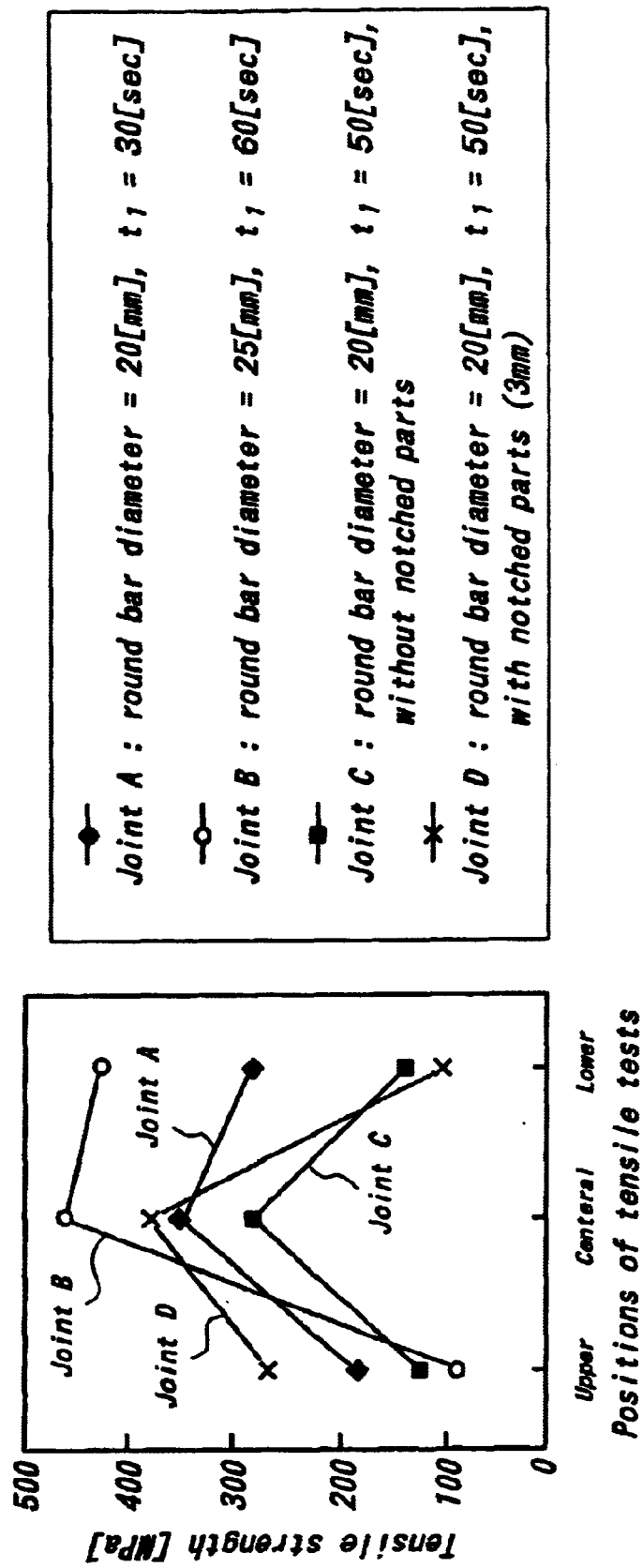
FIG. 22 is a graphical representation showing the tensile strength of upper, center and lower sections of joints A–D.

The tensile tests were performed on specimens cutting from the upper, the center and the lower parts, respectively, of each of the following joints:

Joint A;
Joint B;
Joint C which was jointed under the same conditions as the joints A and B except that a round bar having a diameter of 20 mm provided, with notched portions of 3 mm depth (S45) was used as a filler and the friction time $t_1$, was 50 sec.; and
Joint D which was jointed under the same condition as the joint C except that the filler was a round bar (S45C) of the diameter of 20 mm having the notched parts with the depth of 3 mm in the perimeter. Results are shown in FIG. 22. FIG. 22 clearly shows that each joint has the highest tensile strength, at the central portion and that at most about 80% of the strength of the base material can be secured.

Although the tensile strength tended to decrease at the upper and the lower parts of the joints, the tensile strength at the upper part of the joint D which had the notched parts was increased. As for the joint C in which the plates having a cross section area of 20×20 mm² were joined with the filler having the diameter of 20 mm in the friction time $t_1$ of 50 sec. being larger than that of the joint A, the tensile strength was hardly increased. As for the joint B in which the plates having the cross section area of 20×20 mm² were joined with the intermediate member having the diameter of 25 mm, the tensile strength tended to increase especially at the center and the lower portions.

According to the invention, each workpiece can be joined easily and securely regardless of the size and the shape (e.g. different members) of the workpieces, since the friction pressure is generated by rotating or vibrating the intermediate member of the filler only while the workpieces to be joined allow to be fixed.

Also, since the joined portion doesn't melt in the process (solid phase joint), any defect which is inevitable for the joining method accompanied by melting doesn't occur and the quality at the joined portion can be stabilized.

Further, the rotating apparatus of the intermediate member and the pressurizing apparatus of the workpieces are the only required apparatuses, thus the joining apparatus can be simplified and miniaturized. Also, an on-site application becomes easy to correspond.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method of joining a first workpiece and a second workpiece by friction filling welding, the first workpiece having a first end face through which a firs: longitudinal axis extends and the second workpiece having a second end face through which a second longitudinal axis extends, the method comprising:

arranging the first and second workpieces such that their respective first and second end faces are positioned adjacent each other and separated by a gap;

positioning an intermediate member as a filler of the gap between the first and second end faces, each of the first and second end faces defining a cross sectional area, and the intermediate member having an intermediate longitudinal axis that intersects transversely the first and second longitudinal axes and an exterior surface that covers the crass sectional areas of the first and second end faces;

imparting rotational motion about the intermediate longitudinal axis of or vibratory motion to the intermediate member and pressing the first and second workpieces toward each other in directions along their respective first and second longitudinal axes to produce friction pressure between the exterior surface of the intermediate member and the first and second end faces of the respective first and second workpieces; and upset bonding the first and second workpieces to the intermediate member on bringing the rotational motion or the vibratory motion of the intermediate member to a halt.

2. A method according to claim 1, wherein the pressing of the first and second workpieces in both producing the friction pressure and upsetting the first and second workpieces is performed at a pushing velocity of between 0.01–5 mm/sec.

3. A method according to claim 1 or 2, wherein the rate of rotational motion of the intermediate member is between 100–10,000 rpm or the frequency of vibratory motion of the intermediate member is between 10–1,000 Hz.

4. A method according to claim 1 or 2, wherein the pressing of the first and second workpieces is performed at a pressure that is equal to or greater than the friction pressure produced by the rotational or vibratory motion of the intermediate member.

5. A method according to claim 3, wherein the pressing of the first and second workpieces is performed at a pressure that is equal to or greater than the friction pressure produced by the rotational or vibratory motion of the intermediate member.

6. A method according to claim 1 or 2, wherein a period of time of the pressing of the first and second workpieces against the intermediate member under the rotational motion or the vibratory motion is 1–1,000 seconds and a period of time of the upset bonding of the first and second workpieces is 1–100 seconds.

7. A method according to claim 3, wherein a period of time of the pressing of the first and second workpieces against the intermediate member under the rotational motion or the vibratory motion is 1–1,000 seconds and a period of time of the upset bonding of the first and second workpieces is 1–100 seconds.

8. A method according to claim 4, wherein a period of time of the pressing of the first and second workpieces against the intermediate member under the rotational motion or the vibratory motion is 1–1,000 seconds and a period of time of the upset bonding of the first and second workpieces is 1–100 seconds.

9. A method according to claim 5, wherein a period of time of the pressing of the first and second workpieces against the intermediate member under the rotational motion or the vibratory motion is 1–1,000 seconds and a period of time of the upset bonding of the first and second workpieces is 1–100 seconds.

10. A method according to claim 1, wherein the first and second workpieces are formed of solid materials and each of the first and second end faces defines a cross sectional area of solid material.

11. A method according to claim 1, wherein the first and second workpieces are portions of a unitary article such that the first and second longitudinal axes are portions of a common longitudinal axis.

* * * * *